(12) United States Patent
Carreno-Fuentes et al.

(10) Patent No.: US 9,436,660 B2
(45) Date of Patent: Sep. 6, 2016

(54) BUILDING AND MAINTAINING INFORMATION EXTRACTION RULES

(71) Applicant: International Business Machines Corporation, Armonk, NY (US)

(72) Inventors: Arnaldo Carreno-Fuentes, Dacula, GA (US); Laura Chiticariu, San Jose, CA (US); Eser Kandogan, Mountain View, CA (US); Yunyao Li, San Jose, CA (US); Huahai Yang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 13/679,349

(22) Filed: Nov. 16, 2012

(65) Prior Publication Data

US 2014/0143661 A1    May 22, 2014

(51) Int. Cl.
G06F 17/00 (2006.01)
G06F 17/21 (2006.01)
G06F 17/24 (2006.01)
G06F 17/30 (2006.01)

(52) U.S. Cl.
CPC ............ *G06F 17/218* (2013.01); *G06F 17/24* (2013.01); *G06F 17/30011* (2013.01)

(58) Field of Classification Search
CPC .................. G06F 17/24; G06F 17/30011
USPC ...................................... 715/255
See application file for complete search history.

(56) References Cited

U.S. PATENT DOCUMENTS

| 7,890,533 | B2 | 2/2011 | Pollara |
| 8,131,756 | B2* | 3/2012 | Carus et al. .................. 707/776 |
| 2007/0157087 | A1 | 7/2007 | Foerg et al. |
| 2008/0208857 | A1* | 8/2008 | Liu et al. .......................... 707/6 |
| 2009/0172517 | A1* | 7/2009 | Kalicharan .................... 715/234 |
| 2012/0078950 | A1* | 3/2012 | Conrad et al. ................ 707/769 |
| 2013/0110842 | A1* | 5/2013 | Donneau-Golencer et al. ........................... 707/741 |
| 2013/0290270 | A1* | 10/2013 | Pareek .......................... 707/687 |

OTHER PUBLICATIONS

Nisanth Simon, Blog "Building Extractors using InfoSphere™ BigInsights Text Analytics in Eclipse", Oct. 19, 2011, (PDF version, 7 pages) can be retrieved at <https://www.ibm.com/developerworks/community/blogs/ibm-big-data/entry/building_extractors_using_infosphere_biginsights_text_analytics_in_eclipse?maxresults=1&page=1&lang=en_us>.*

(Continued)

*Primary Examiner* — Stephen Hong
*Assistant Examiner* — Marshon Robinson
(74) *Attorney, Agent, or Firm* — Ference & Associates LLC

(57) ABSTRACT

Methods and arrangements for managing development of information extraction rules. One or more documents are opened for extraction. An interface is provided to create a label and thereupon label a portion of the document. The created label is stored, and an extractor is developed based on the labeling. A test interface is provided for the extractor, and results of a test conducted through the test interface are displayed. The extractor is exported. In accordance with at least one embodiment, developers are presented with eased automated guidance to write extractors, which thereby reduces an overall manual effort involved in extractor development. Generally, a focused, tutorial-type environment serves as a guide based on previously developed best practices.

18 Claims, 13 Drawing Sheets

(56) References Cited

OTHER PUBLICATIONS

Alemany, Laura Alonso I, et al., "A System for Adaptive Information Extraction from Highly Informal Text," Proceedings of the 16th International Conference on Applications of Natural Language to Information Systems, NLDB 2011, 1 page, Abstract only, Springer Verlag, Berlin, Germany.

Li, Yunyao, et al., "WizIE: A Best Practices Guided Development Environment for Information Extraction," Proceedings of the 50th Annual Meeting of the Association for Computational Linguistics, Jeju, Republic of Korea, Jul. 8-14, 2012, pp. 109-114, Association for Computational Linguistics, MIT Press, Cambridge, Massachusetts, USA.

Chiticariu, L., et al., "Domain Adaptation of Rule-Based Annotators for Named-Entity Recognition Tasks", Proceedings of the 2010 Conference on Empirical Methods in Natural Language Processing, Oct. 9-11, 2010, pp. 1002-1012, Association for Computational Linguistics, MIT, Massachusetts, USA.

\* cited by examiner

FIG. 4

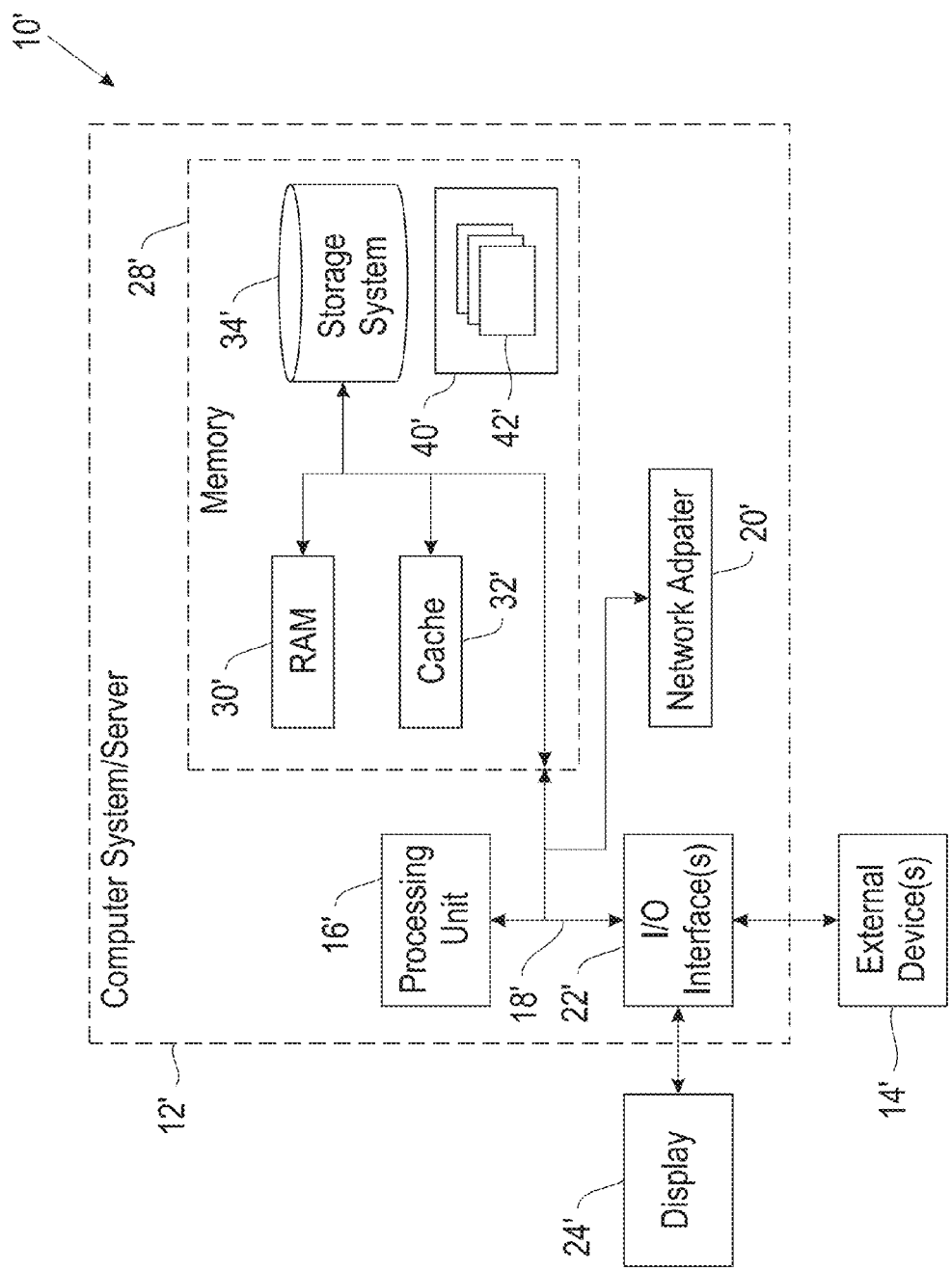

BUILDING AND MAINTAINING INFORMATION EXTRACTION RULES

BACKGROUND

Information extraction (IE) refers to the problem of extracting structured information from unstructured or semi-structured text. It has been well-studied in the realm of Natural Language Processing. In recent years, IE has emerged as a critical building block in a wide range of enterprise applications, including financial risk analysis, social media analytics and regulatory compliance, among many others. An important practical challenge driven by the use of IE in these applications is usability, particularly, how to enable the ease of development and maintenance of high-quality information extraction rules, also known as annotators, or extractors.

Generally, the development of extractors presents itself as a notoriously labor-intensive and time-consuming process. In order to ensure highly accurate and reliable results, this task is traditionally performed by trained linguists with domain expertise. As a result, extractor development is regarded as a major bottleneck in satisfying the increasing text analytics demands of enterprise applications.

BRIEF SUMMARY

In summary, one aspect of the invention provides a method comprising opening one or more documents for extraction. The method includes providing an interface to create a label and thereupon label a portion of the document, and storing the created label. Further, the method includes developing an extractor based on the labeling, providing a test interface for the extractor, and displaying results of a test conducted through the test interface. Additionally, the method includes and exporting the extractor.

Another aspect of the invention provides an apparatus comprising at least one processor, and a computer readable storage medium having computer readable program code embodied therewith and executable by the at least one processor. The computer readable program code comprises computer readable program code configured to open one or more documents for extraction. The computer readable program code also includes computer readable program code configured to provide an interface to create a label and thereupon label a portion of the document, and computer readable program code configured to store the created label. Further, the computer readable program code includes computer readable program code configured to develop an extractor based on the labeling, computer readable program code configured to provide a test interface for the extractor, and computer readable program code configured to display results of a test conducted through the test interface. Also, the computer readable program code includes computer readable program code configured to export the extractor.

An additional aspect of the invention provides a computer program product comprising: a computer readable storage medium having computer readable program code embodied therewith. The computer readable program code comprises computer readable program code configured to open one or more documents for extraction. The computer readable program code also includes computer readable program code configured to provide an interface to create a label and thereupon label a portion of the document, and computer readable program code configured to store the created label. Further, the computer readable program code includes computer readable program code configured to develop an extractor based on the labeling, computer readable program code configured to provide a test interface for the extractor, and computer readable program code configured to display results of a test conducted through the test interface. Also, the computer readable program code includes computer readable program code configured to export the extractor.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 illustrates two phases of use of an extraction tasks view.

FIG. 13 illustrates a computer system.

DETAILED DESCRIPTION

Figure 1:
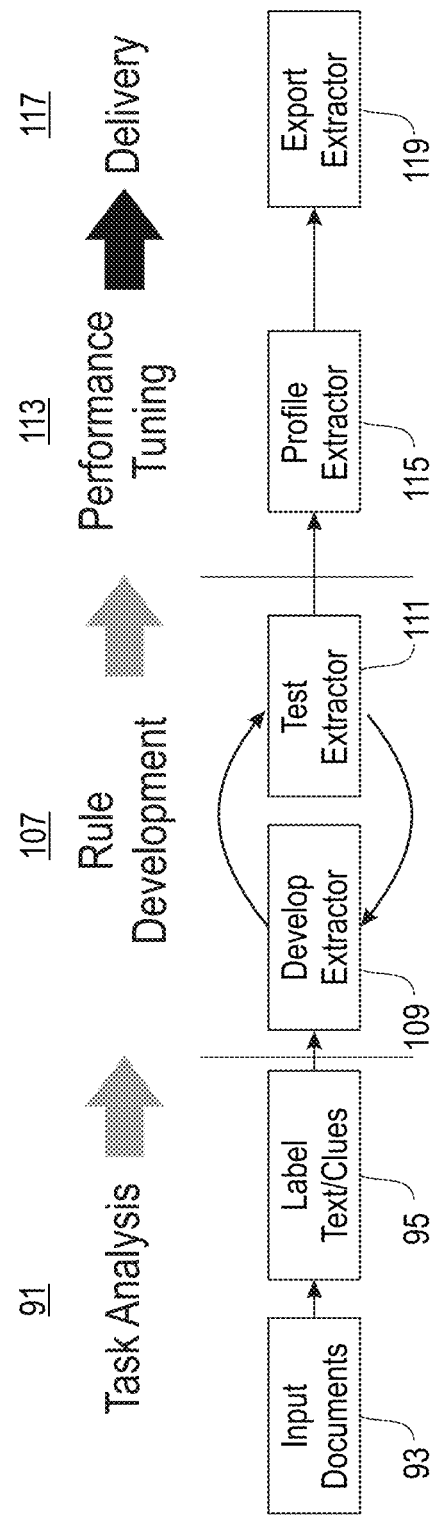
FIG. 1 schematically illustrates phases of an extractor development process.

Broadly contemplated herein, in accordance with at least one embodiment of the invention, is the use of an IE development environment configured to permit developers with little or no linguistic background to write high quality extractors, which thereby reduces an overall manual effort involved in extractor development. Generally, a wizard-like environment guides extractor development based on best practices drawn from the experience of trained linguists and expert developers. In so doing, natural entry points are provided for different tools focused on reducing the effort required for performing common tasks during IE development.

In accordance with at least one embodiment of the invention, a workflow interface provides a step-by-step guide for developing an information extractor program (or extractor) in six steps: select input data; label text snippets and clues of interest; develop extraction rules; test the extraction rules; profile the extraction rules and export the extraction rules to a compiled executable plan. Among the main components are an extraction tasks view, which contains or provides instructions for the aforementioned six steps, and an extraction plan view, which captures a semantic overview of an extractor, including data examples, as well as extraction rules for capturing the examples.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-11. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 13. In accordance with an example embodiment, most if not all of the process steps, components and outputs discussed with respect to FIGS. 1-11 can be performed or utilized by way of a processing unit or units and system memory such as those indicated, respectively, at 16' and 28' in FIG. 13, whether on a server computer, a client computer, a node computer in a distributed network, or any combination thereof.

Figure 9:
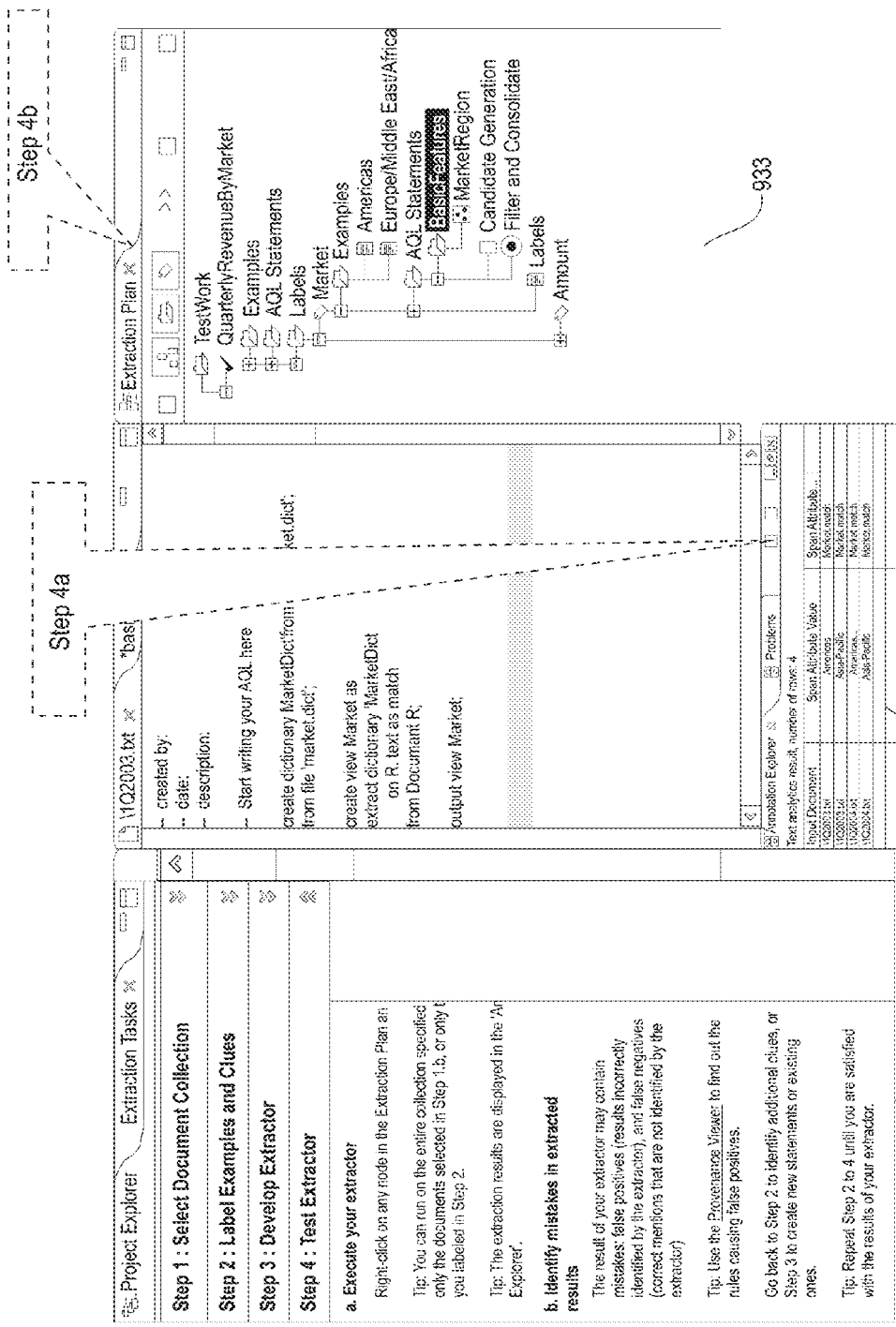
FIG. 9 illustrates a fourth step, testing of the extractor, with respect to the extraction tasks view
Figure 10:
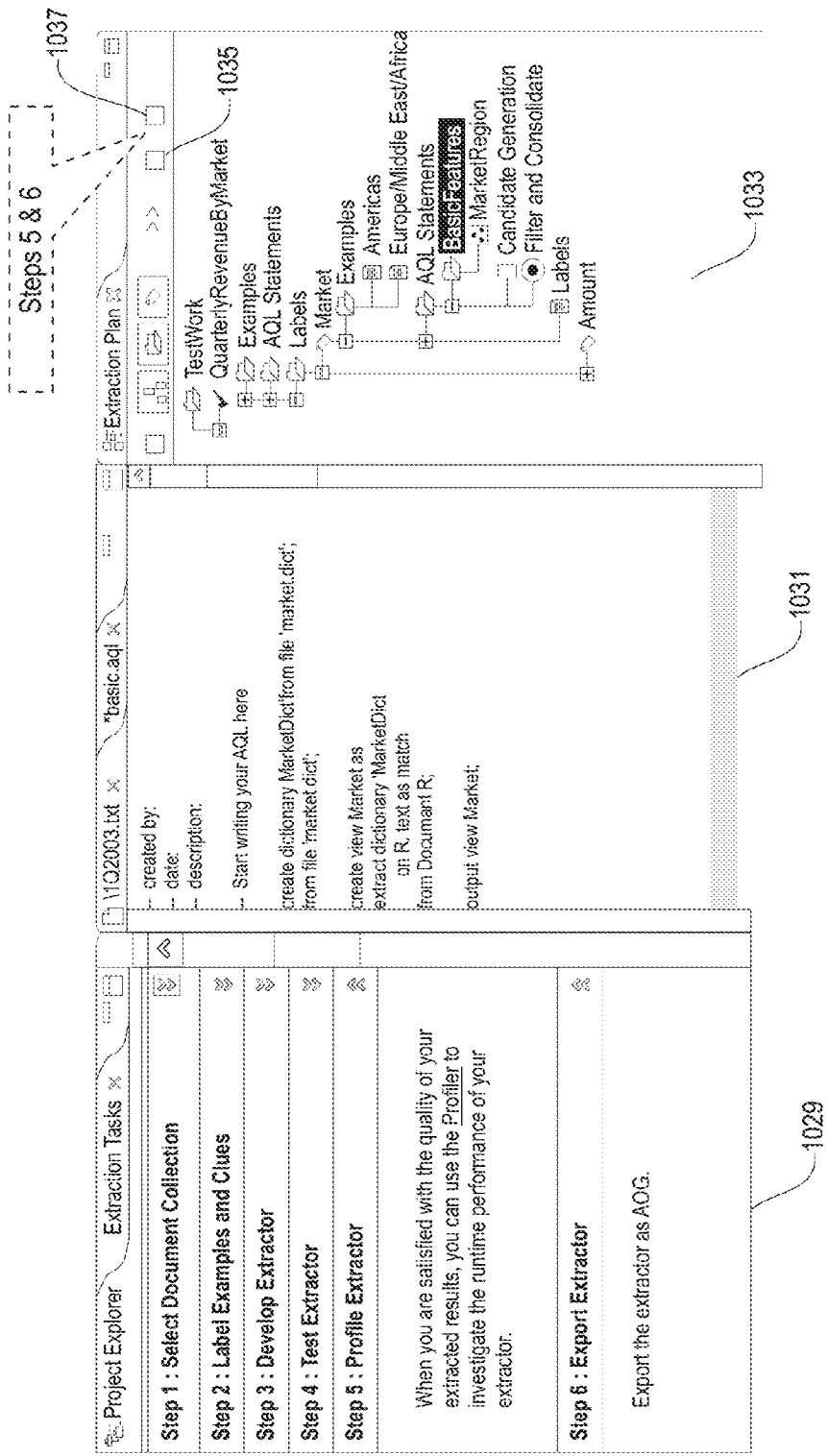
FIG. 10 illustrates fifth and sixth steps, profiling and exporting the extractor, respectively, with respect to the extraction tasks view.
Figure 11:
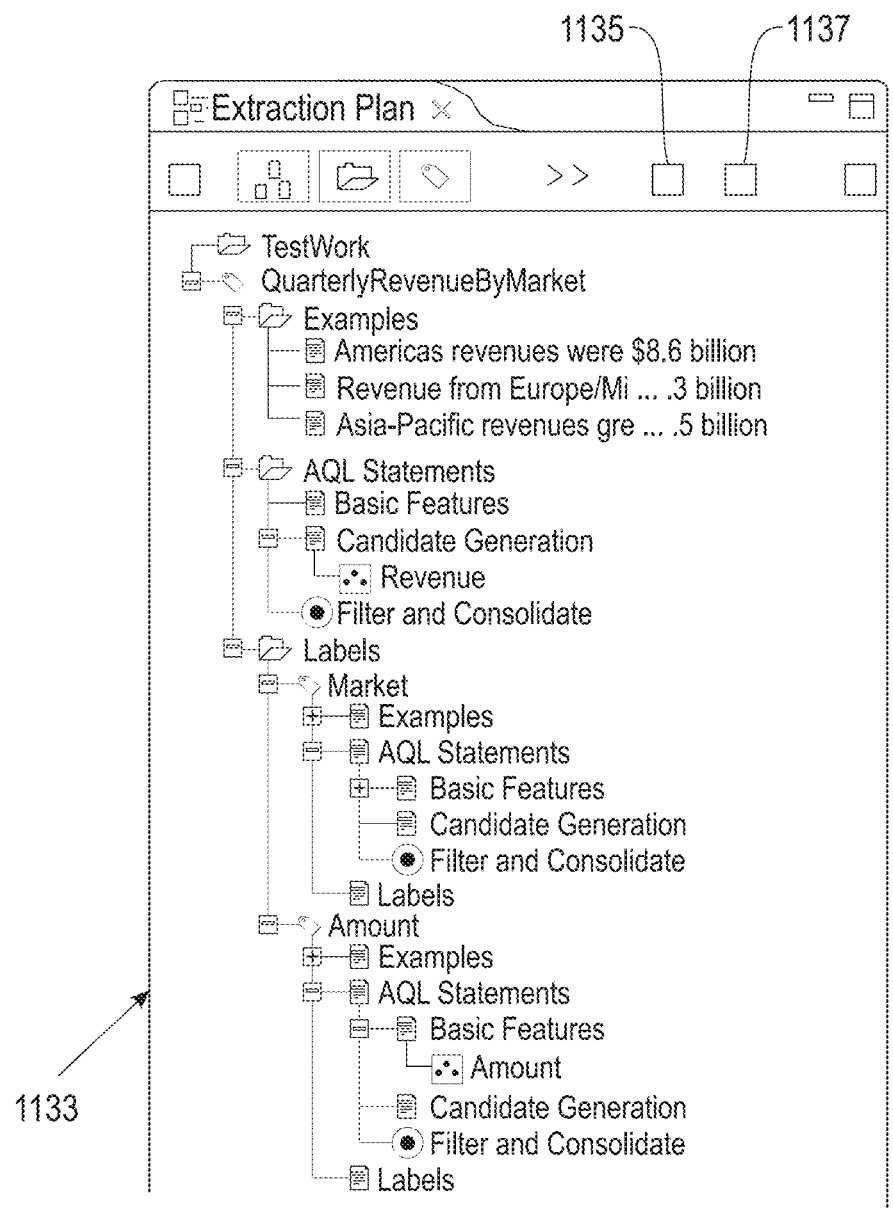
FIG. 11 illustrates an extraction plan view.

To facilitate easier reference, in advancing from FIG. 1 to and through FIG. 11, a reference numeral is advanced by a multiple of 100 in indicating a substantially similar or analogous component or element with respect to at least one component or element found in at least one earlier figure among FIGS. 1-11.

Generally, in accordance with at least one embodiment of the invention, a user examines data, and findings are recorded in the extraction plan. Snippets of text to be extracted are labeled along with clues that would be useful in extraction, and these can be viewed as formal test cases for the final extraction; this will be better appreciated from the description of FIG. 6 herebelow. The extraction plan then captures the final intent and semantics of the AQL code at a high level (wherein AQL is a query language based on APL, A Programming Language). The user is then encouraged to think in terms of a predetermined "Best Practices" methodology, whereby the extraction tasks view encourages or enforces such a methodology in developing extractors. Such practices are associated, e.g., with analyzing the input data, identifying text that must be extracted, developing rules (including testing, debugging, and performance optimizations) and exporting to a compiled execution plan. An extraction plan view then enforces a top-down approach to developing rules, as well as rules categorized into three categories (basic features, candidate generation, filter & consolidate), which may correspond to the best practices. The tool then can expose the user to the "full power" of the language but in a subtle fashion, whereby a palette of statements appropriate for each rule category are provided. The user then selects a type of statement and the tool provides a template for the statement, where the user can proceed to "fill in the blanks".

In accordance with at least one embodiment of the invention, it is recognized that a development process for extractors can include four phases as schematically illustrated in FIG. 1. First, in a task analysis phase 91, extraction tasks are defined based on high-level business requirements; documents are input (93) and text in the documents is labeled along with potential clues for assisting in extraction (95). For each extraction task, IE rules are developed during a rule development phase (107). Here, then, an extractor is developed (109) and tested (111); these steps iterate as needed. The rules are profiled and further fine-tuned (115) in a performance tuning phase 113, to ensure high runtime performance. Finally, in a delivery phase 117, the rules are packaged so that they can be easily exported (119) and thereupon embedded in various applications.

In accordance with at least one embodiment of the invention, both novice and experienced developers are assisted by providing an intuitive wizard-like interface that is informed by best practices in extractor development throughout each of these phases. By doing so, key missing pieces in a conventional IE development environment can be provided or "filled in".

Figure 2:
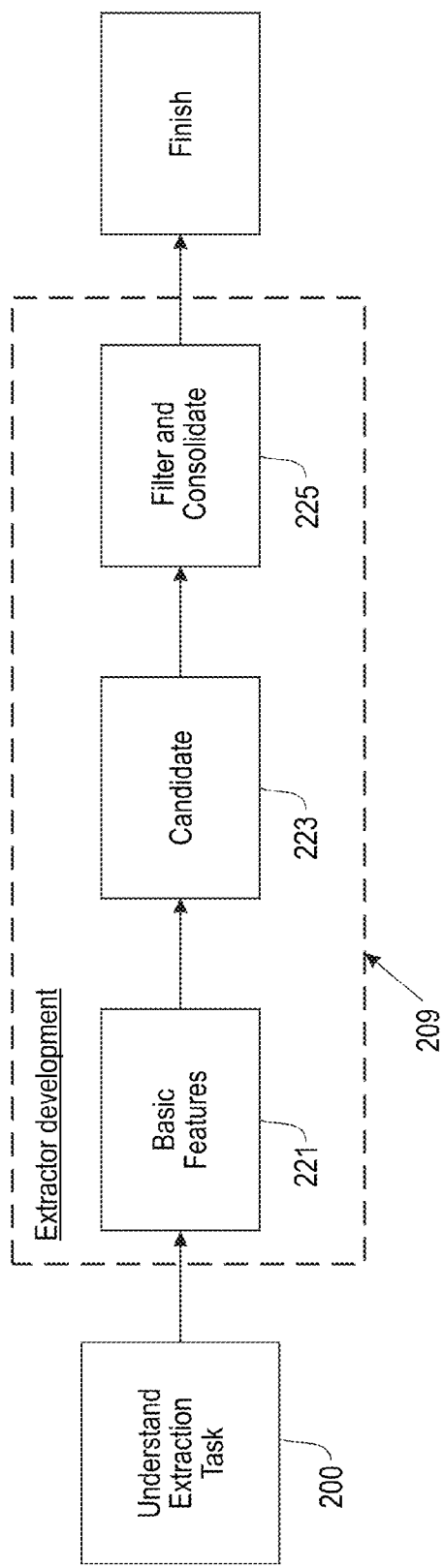
FIG. 2 schematically illustrates a general process overview.

FIG. 2 schematically illustrates another general process overview, in accordance with at least one embodiment of the invention. As shown, in a first general step, the user is assisted (200) in understanding the extraction task by asking them to examine the data and label text snippets of interest.

Thence, a general extractor development step 209 includes enforcing a predetermined structure for building extractors, via three categories of "basic features" 221, "candidate generation" 223 and "consolidation" 225. Basic features 221 include individual "building blocks", such as capitalized word regex ([A-Z[a-z]+) and a dictionary of first names. Candidate generation 223 involves defining "complete" candidates, e.g., the full name of a person. Consolidation 225 then deals with overlapping annotations from candidate rules. A very wide variety of extraction tasks can be accommodated; these can include, by way of illustrative and non-restrictive examples: entity tasks (e.g., financial metrics or tasks related to organizations) relationship tasks (e.g., company acquisitions or earning announcements) and complex tasks (e.g., driving directions, sentiment, intent to buy).

Figure 3:
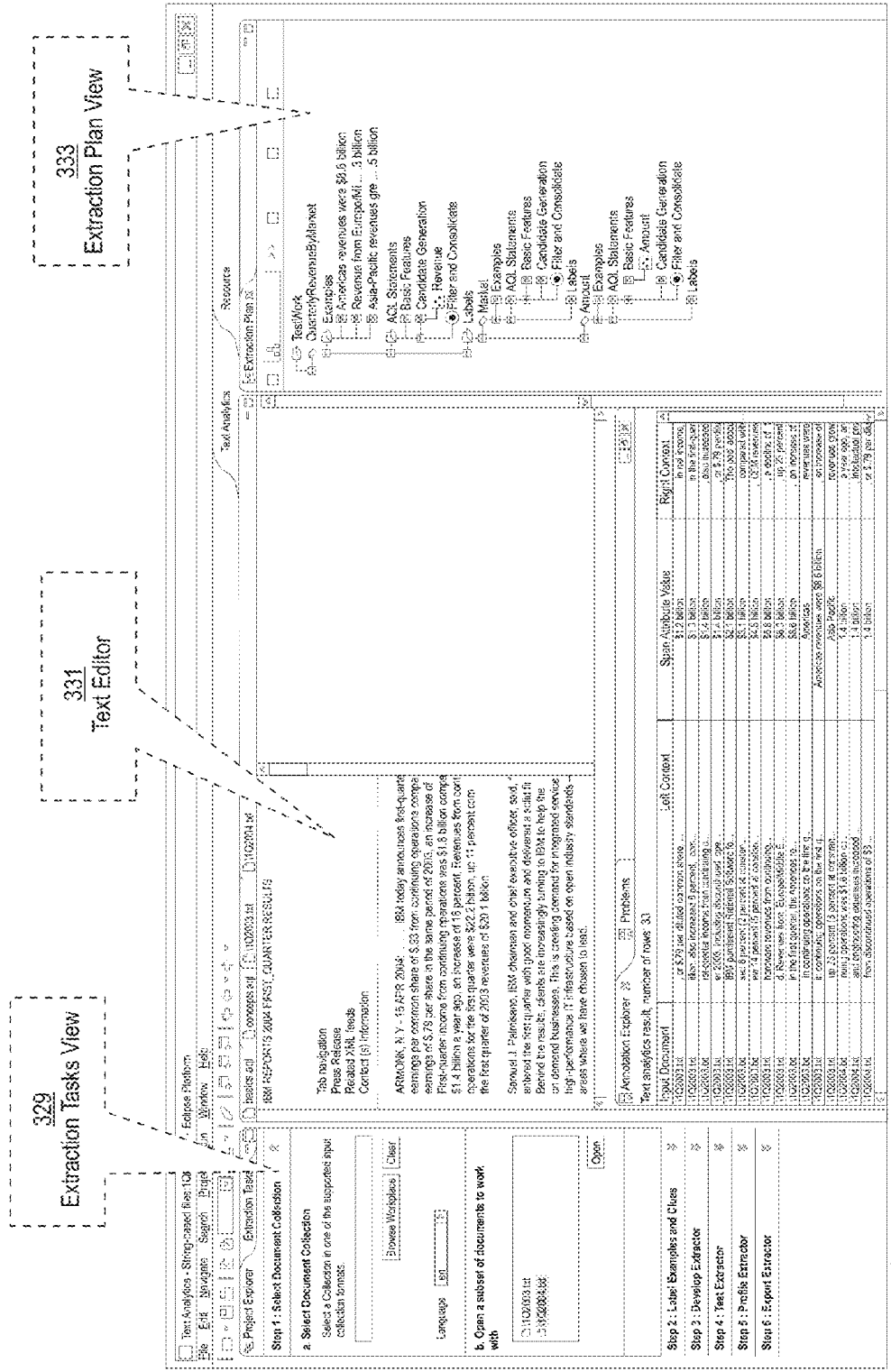
FIG. 3 illustrates a graphical user interface (GUI), showing in particular a workflow perspective.

FIG. 3 illustrates a graphical user interface (GUI) 327 in accordance with at least one embodiment of the invention, showing in particular a workflow perspective. As shown, an extraction tasks view 329 illustrates a sequence of operations to be performed for extractor development. A text editor 331 is provided for labeling input documents (e.g., via providing an AQL editor for AQL code) and an extraction plan view 333 provides a semantic overview of the extractor.

Figure 4:
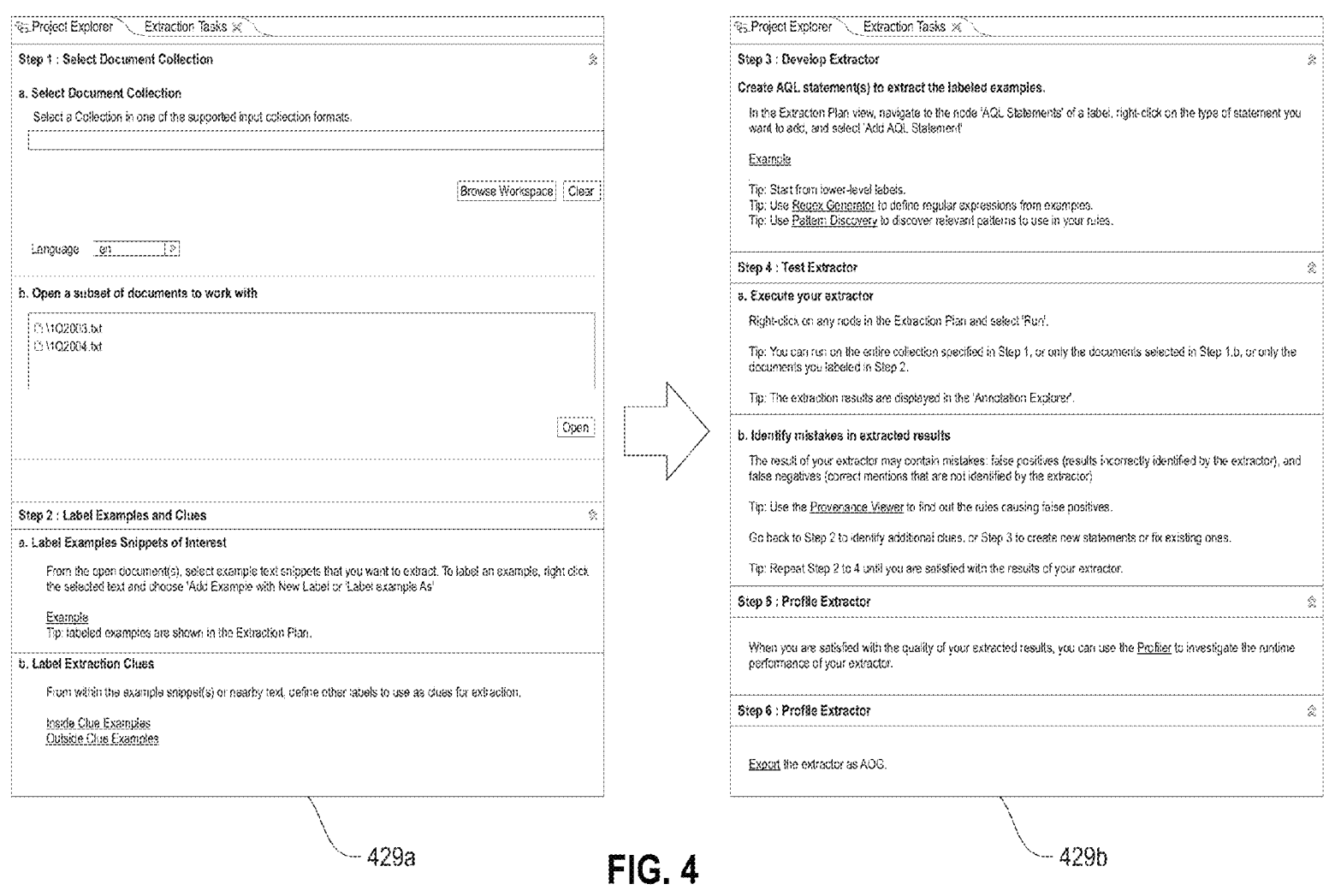

FIG. 4 illustrates two phases (labeled in the illustrated GUI views as steps 1-2 followed by steps 3-6) of use of an extraction tasks view, 429a and 429b, respectively, in accordance with at least one embodiment of the invention. Generally, this view (429a/b) guides the user through a sequence of tasks to perform when developing an extractor. The steps, as labeled in the illustrated GUI views, are as follows: (1) Open Document Collection; (2) Label examples and clues of interest; (3) Develop extractor; (4) Test extractor; (5) Profile; and (6) Export. Generally, steps (2)-(5) are likely to be performed iteratively many times.

Figure 5:
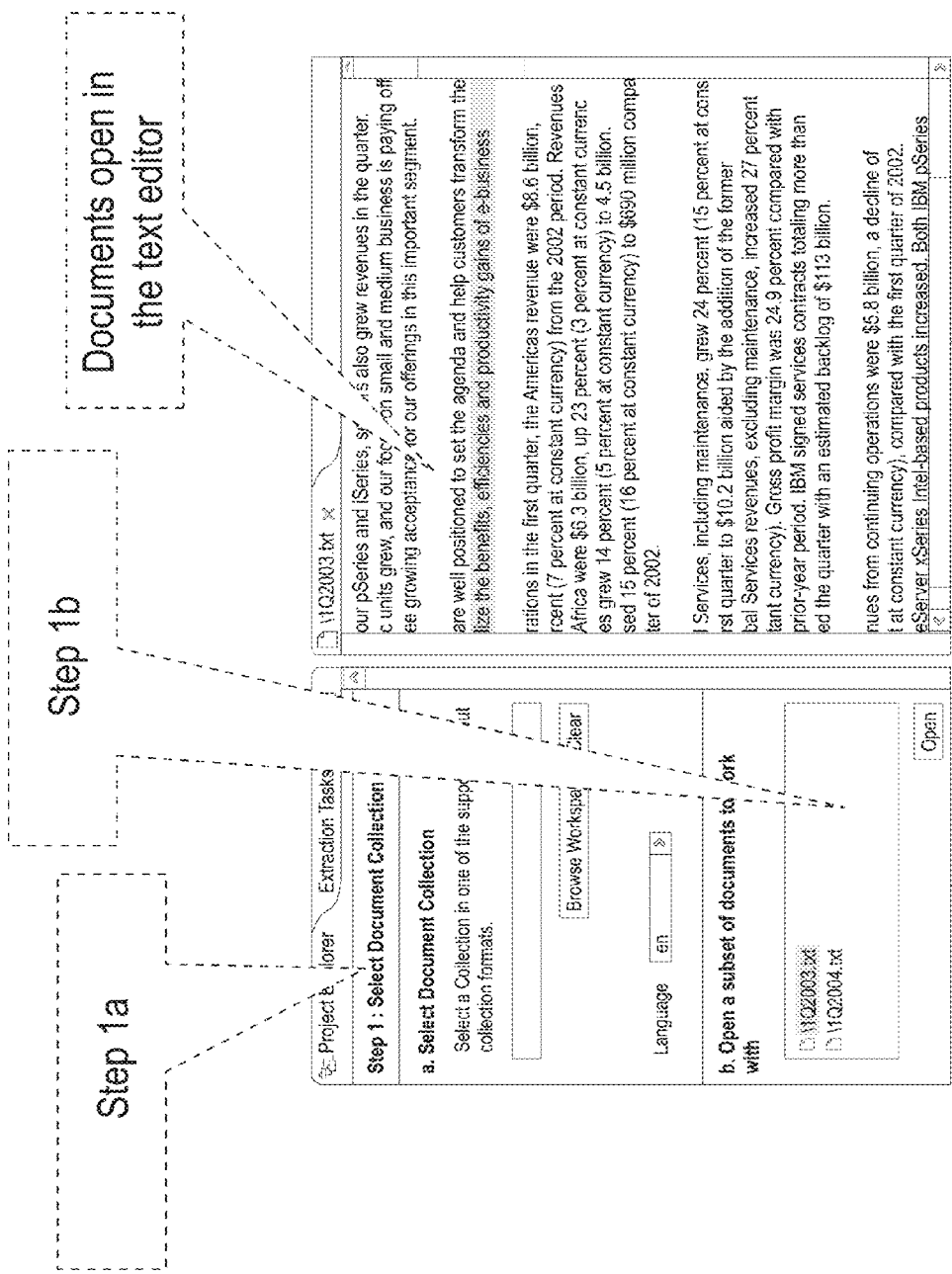
FIG. 5 illustrates a first step, opening a document collection, with respect to the extraction tasks view.

FIG. 5 illustrates a first step, opening a document collection, with respect to extraction tasks view 529, in accordance with at least one embodiment of the invention. In a first sub-step 1a, the user clicks and dialog opens where user selects an input collection and in a subsequent sub-step 1b, the user chooses which documents in the selected collection to review. A document so chosen then shows up in the text editor. (An allowance can also be made for multiple documents to be opened up in the text editor pane, e.g., in a separate tab.)

Figure 6:
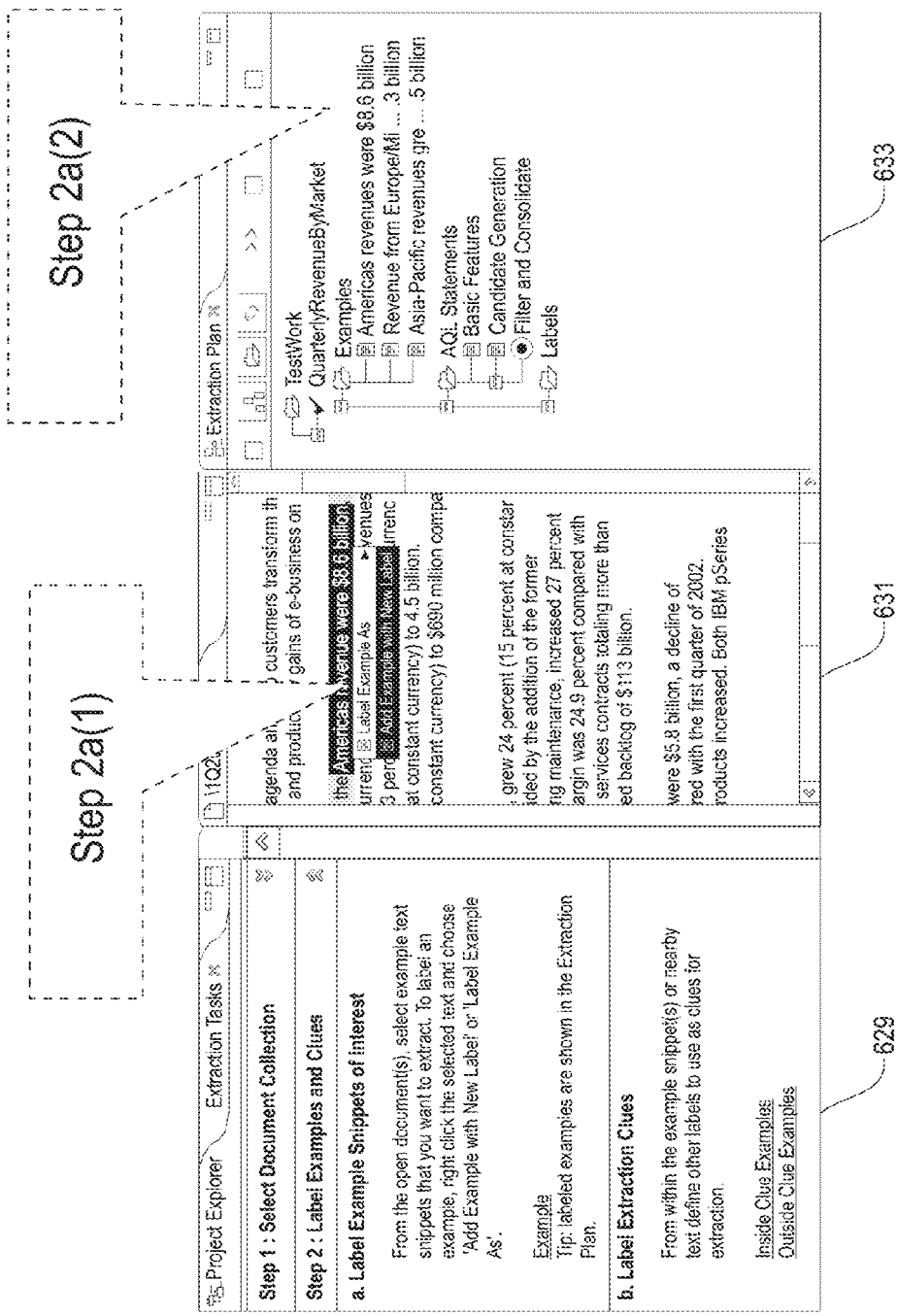
FIG. 6 illustrates a first sub-step of a second step (labeling examples and clues of interest) with respect to the extraction tasks view.

FIG. 6 illustrates a first sub-step of a second step (labeling examples and clues of interest) with respect to extraction tasks view 629, in accordance with at least one embodiment of the invention. First, in a step 2a(1), the user examines a few input documents and labels the snippets of information he/she wants to extract. By way of illustrative example, the user may do this by going to text editor 631 and highlighting selected text, and then right-clicking to access options such as "label example as . . . " and/or "add example with new label". Labeled examples (snippets) are then recorded (i.e., stored) in the extraction plan 633 (step 2a(2)). Such recording or storage can take any of a variety of forms in accordance with embodiments of the invention; in the present illustrative example, such recording/storage is carried out with respect to a hierarchy of memory-based folders or nodes as shown (by way of illustrative example) in the field constituted by extraction plan 633 in FIG. 6.

Figure 7:
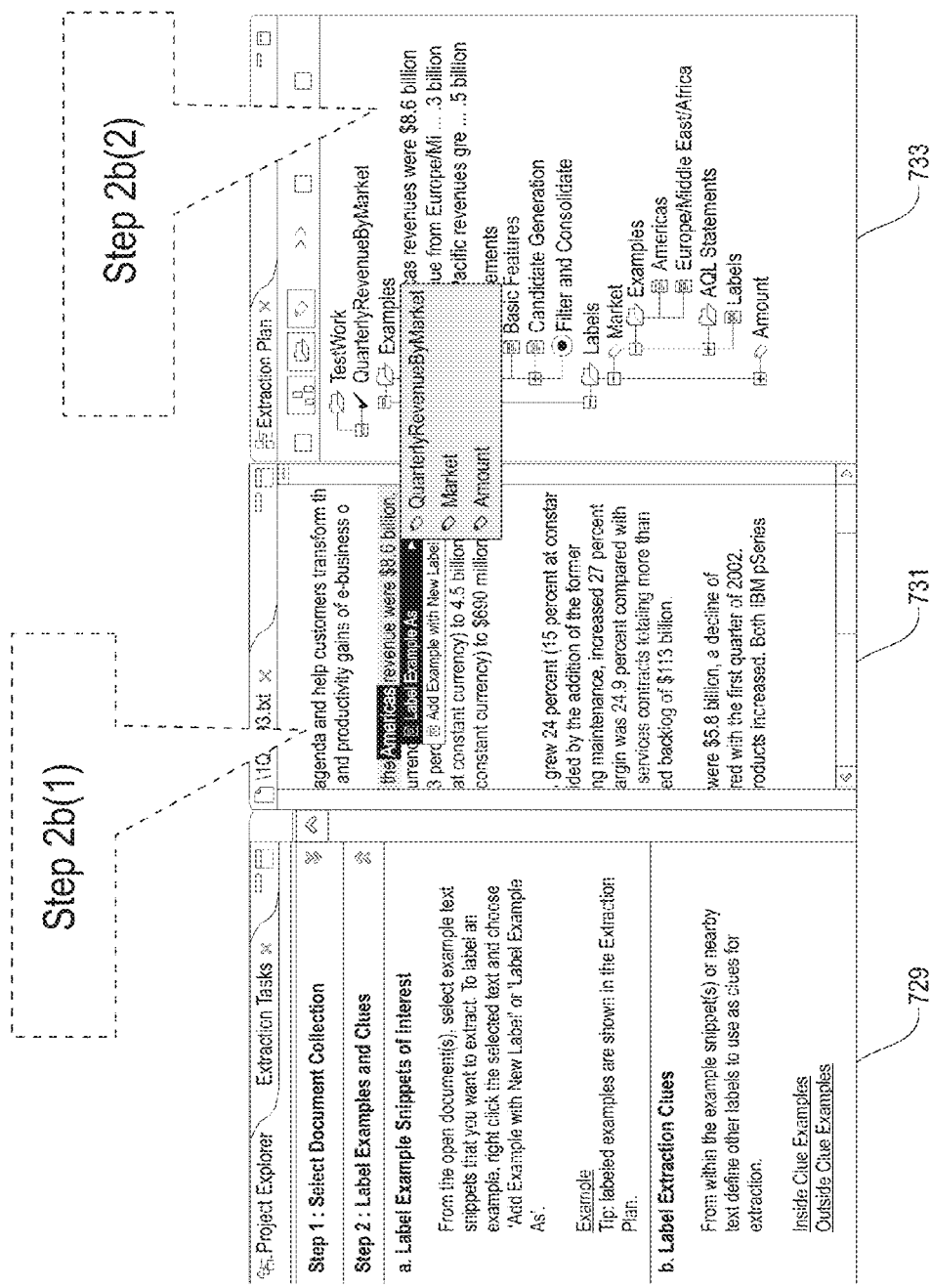
FIG. 7 illustrates a second sub-step of the aforementioned second step with respect to the extraction tasks view.

FIG. 7 illustrates a second sub-step of the aforementioned second step with respect to the extraction tasks view 729, in accordance with at least one embodiment of the invention. First, in a step 2b(1), and in document viewer 731, the user labels additional clues, from within the labeled examples or from text near to the same, and such clues are configured to capture why a labeled example is desirable for extraction. (As shown, in response to choosing "label example as", a right-clicked pull-down menu can assist a user in choosing an existing label by providing ready choices for the same; such choices could include, but need not be limited to, those labels that the user has already created.) In a next step 2b(2), such clues are also recorded in the extraction plan 733.

Figure 8:
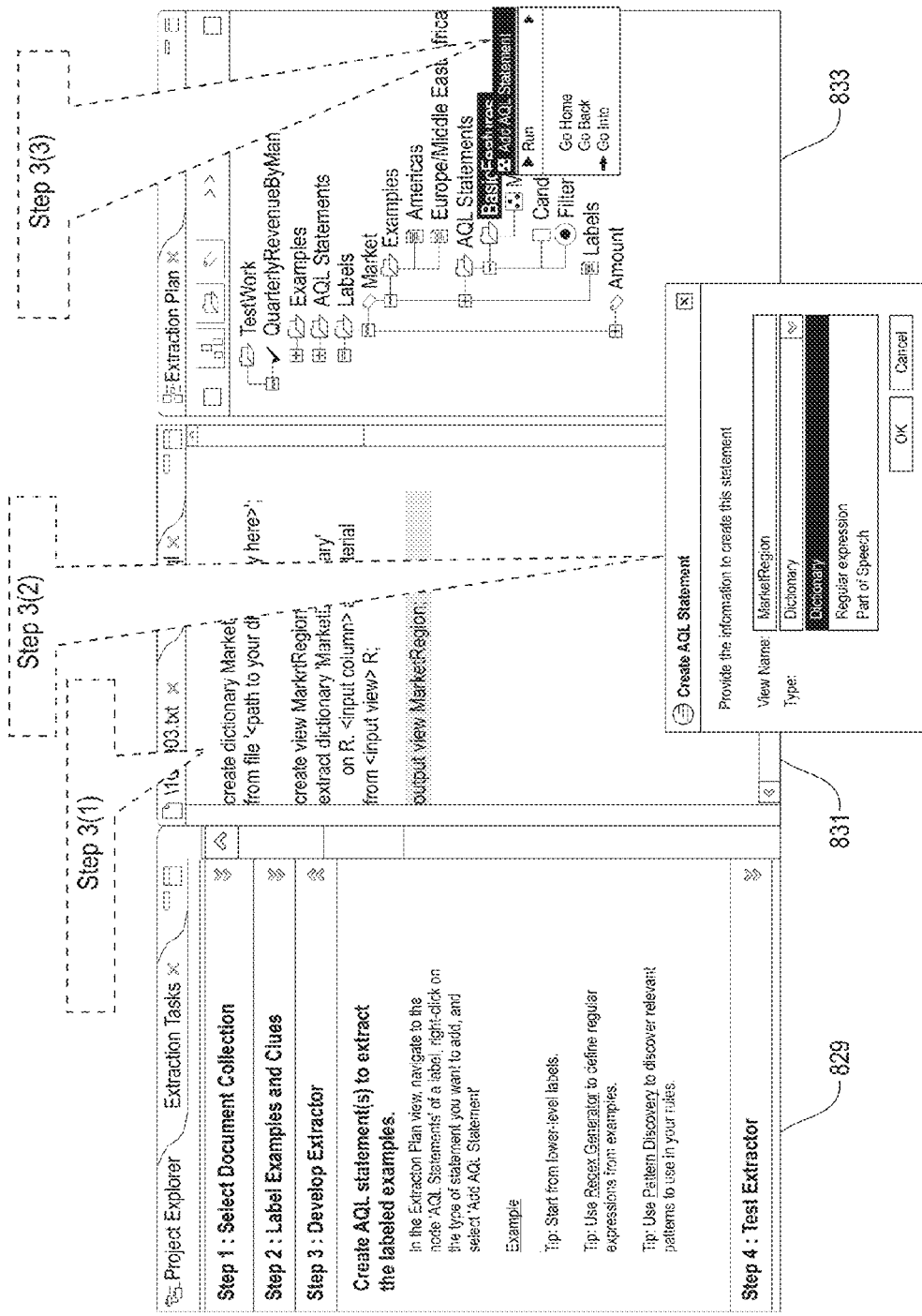
FIG. 8 illustrates a third step, developing an extractor, with respect to the extraction tasks view.

FIG. 8 illustrates a third step, developing an extractor, in accordance with at least one embodiment of the invention. In a first sub-step 3(1), a template statement is inserted into the AQL file in document viewer 831, and the user fills in the blanks in the template and edits directly in the AQL Editor. (Here, there need not be any generated code, in that a code template may be generated that itself does not constitute fully working code. Thus, essentially only a template need be in play here, where the user then proceeds to add to the template, or "fill in the blanks") A palette of statements appropriate for "Basic Feature" category appears (step 3(2)); the same applies for "Candidate Rules" and "Filter&Consolidate" section. Then (step 3(3)), in the extraction plan 833, the user starts developing AQL to capture examples of each label, starting from lower-level clues, to the top-level examples that need to be extracted.

FIG. 9 illustrates a fourth step, testing of the extractor, in accordance with at least one embodiment of the invention. In a first sub-step 4a, results are visualized in an annotation explorer, which represents a portion of document viewer 931. Thence, in a sub-step 4b, with respect to extraction plan 933, the extractor is run on the entire input collection, the documents that were selected in step 1b, and the documents that were labeled in step 2.

FIG. 10 illustrates fifth and sixth steps, profiling and exporting the extractor, respectively, with respect to the extraction plan 1033 and in accordance with at least one embodiment of the invention. Two squares 1035 and 1037, as shown, can be clicked upon for the profiling and exporting steps, respectively. In the former step, the runtime performance of the extractor can be tested.

FIG. 11 illustrates an extraction plan view 1133, in accordance with at least one embodiment of the invention. Generally, this view captures a semantic overview of the extractor, including examples and clues labeled in Step 2 and AQL Code developed in Step 3. The AQL code is associated with a label, and each label corresponds to either an example of text snippet that should be extracted, or a clue that is useful for identifying an example as candidate for extraction. The structure of a label node can include AQL statements and labels. For their part, AQL Statements can be organized into three categories of basic features, candidate generation and filter/consolidate. Each category exposes a number of template AQL statements that are appropriate for that category. The labels, on the other hand, can convey the set of labels of additional clues recorded in Step 2.

In accordance with at least one embodiment of the invention, the extraction plan can provide a functionality of moving, renaming or deleting nodes. This involves simply semantic reorganization, with no effect on underlying AQL code. A label can be marked as done or undone, e.g., to the extent that a user has finished AQL development for the label. Examples can be highlighted in input documents. An AQL statement can be added here, wherein an AQL template is added in a correct .aql file for the label and category of a statement. The user may modify the template as he/she wishes.

In accordance with at least one embodiment of the invention, in the extraction plan view, a bidirectional link from the extraction plan node can be made to view definition in AQL code. From the statement node in the extraction plan, one can jump to the place in AQL code where the view is defined, and an error message can be shown if the view is not defined. From AQL editor, a view name can be selected in "create view statement" and added to a label (e.g., via drag and drop). Running (that is, testing) the extractor can be undertaken as described heretofore with respect to step 4, profiling (step 5) can take place with a predetermined default running time (e.g., 60 seconds), and exporting (step 6) can take place via popping up a wizard for that purpose.

Inasmuch as a set or framework of best practices are discussed herein with respect to embodiment of the invention, it should be understood that suitable examples of such best practices can derive from any of a great variety of sources. One such source, by way of illustration, is constituted by the best practices discussed in the following reference, which may be referred to for background purposes: Laura Chiticariu, Rajasekar Krishnamurthy, Yunyao Li, Frederick Reiss, and Shivakumar Vaithyanathan: "Domain Adaptation of Rule-Based Annotators for Named-Entity Recognition Tasks", 2010 *Conference on Empirical Methods in Natural Language Processing:* 1002-1012.

It can be appreciated from the foregoing that, in accordance with at least one embodiment of the invention, a useful tool is provided, via an interface, that permits a user to develop an extractor and to do so in a manner that enjoys some efficiencies as compared to conventional arrangements for providing such training to a non-expert. As discussed herein, best practices can be accommodated and disseminated to assist in such training (or guidance). At the same time, there are broadly contemplated herein variant embodiments of the invention which employ significantly less manual intervention and thus may be carried out with significantly more automation.

Accordingly, by way of an illustrative example in accordance with at least one variant embodiment of the invention, an extractor may be developed by automatically incorporating best practices and guidelines in a manner that automatically generates rules and guidelines for a new extractor. Such automatic generation, for instance, can involve an automatic parsing and labeling of text in a manner that foregoes a need for manual intervention. Such automated steps can be carried to a point where one or more steps of manual intervention may be warranted or desired or, in the alternative, can constitute an entirely automated process.

Figure 12:
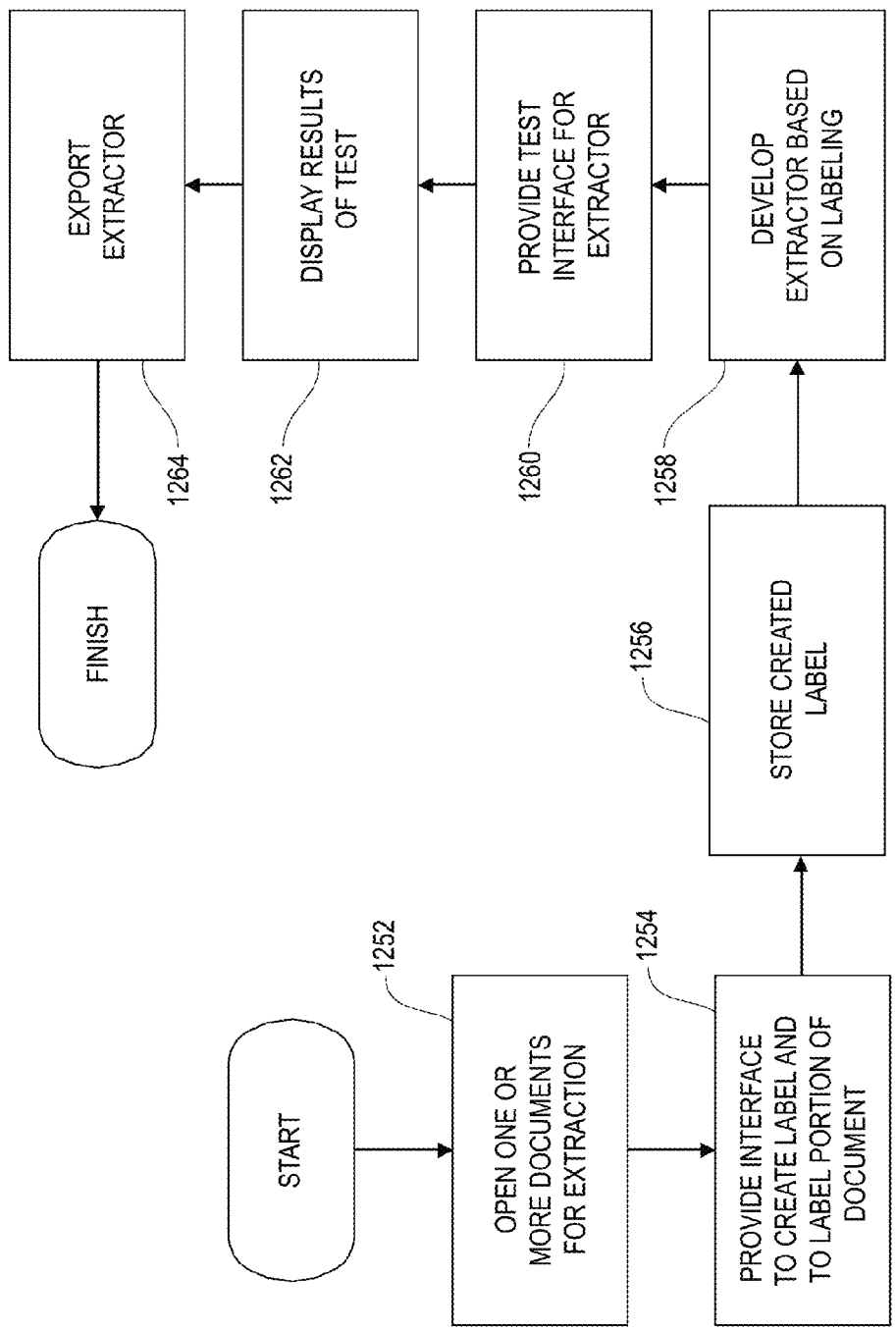
FIG. 12 sets forth a process more generally for managing development of information extraction programs

FIG. 12 sets forth a process more generally for managing information extraction, in accordance with at least one embodiment of the invention. It should be appreciated that a process such as that broadly illustrated in FIG. 13 can be carried out on essentially any suitable computer system or set of computer systems, which may, by way of an illustrative and non-restrictive example, include a system such as that indicated at 12' in FIG. 13. In accordance with an example embodiment, most if not all of the process steps discussed with respect to FIG. 12 can be performed by way of a processing unit or units and system memory such as those indicated, respectively, at 16' and 28' in FIG. 13.

As shown in FIG. 12, in accordance with at least one embodiment of the invention, one or more documents are opened for extraction. An interface is provided to create a label and thereupon label a portion of the document. The created label is stored, and an extractor is developed based on the labeling. A test interface is provided for the extractor, and results of a test conducted through the test interface are displayed. The extractor is exported.

Referring now to FIG. 13, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   opening one or more documents for extraction;
   providing an interface to create a label and thereupon label a portion of the document;
   said providing of an interface comprising providing an extraction tasks view, a text editor and an extraction plan view;
   receiving at least one labeled example, wherein the at least one labeled example is labeled by a user and wherein the at least one labeled example identifies a portion of the document to extract;
   receiving at least one clue label created by the user, wherein the clue label indicates a reason for extraction of the at least one labeled example;
   storing the received at least one labeled example and at least one clue label in the extraction plan;
   developing an extractor using the at least one labeled example and the at least one clue label;
   said developing comprising conveying a predetermined structure for guiding a user and further comprising creating extraction rules based upon the at least one labeled example and the at least one clue label;
   wherein the predetermined extractor structure comprises the categories of: basic features, candidate generation, and consolidation;
   providing a test interface for the extractor;
   thereupon testing the extractor through the test interface;
   displaying results of a test of the extractor conducted through the test interface;
   permitting iteration of said steps of developing the extractor and testing the extractor; and
   exporting the extractor.

2. The method according to claim 1, wherein said providing of an interface comprises providing an interface portion to permit said storing of the created label.

3. The method according to claim 1, wherein said developing comprises storing the extraction rules.

4. The method according to claim 3, wherein said providing of an interface comprises providing an interface portion to permit said creating and storing of extraction rules.

5. The method according to claim 4, wherein:
   said providing of an interface portion to permit said creating and storing of extraction rules comprises providing an interface for creating at least one top-level node configured to capture at least one main concept to be extracted; and
   said creating comprises creating the at least one top-level node.

6. The method according to claim 5, wherein each at least one top-level node comprises examples for recording labeled snippets and extraction rules for capturing labeled snippets.

7. The method according to claim 6, wherein:
   said creating of the at least one top-level node comprises creating the examples;
   said creating of the examples comprises creating examples of the at least one main concept and creating clues configured to guide extraction of the at least one main concept.

8. The method according to claim 6, wherein the extraction rules for capturing labeled snippets comprise code generation for rules from actions performed with respect to the at least one top-level node.

9. The method according to claim 5, wherein the interface for creating at least one top-level node comprises a drag and drop function that coordinates with a text editor.

10. The method according to claim 1, wherein said providing of a test interface comprises affording a capability to select snippets and clues to label and to display extraction results associatively with respect to labels.

11. The method according to claim 1, wherein the test interface comprises a portion of the interface.

12. The method according to claim 1, further comprising functionally coordinating the test interface with a remainder of the interface such that actions undertaken with respect to the test interface are reflected in the remainder of the interface and actions undertaken with respect to the remainder of the interface are reflected in the test interface.

13. The method according to claim 1, wherein said conveying of a predetermined structure comprises conveying a predetermined structure with respect to at least one rule associated with at least one top-level node to thereby guide a user in developing the rules for that node.

14. The method according to claim 1, wherein said providing of an interface comprises providing a mechanism for a user to alter the predetermined extractor structure.

15. An apparatus comprising:
   at least one processor; and
   a computer readable storage medium having computer readable program code embodied therewith and executable by the at least one processor, the computer readable program code comprising:
   computer readable program code configured to open one or more documents for extraction;
   computer readable program code configured to provide an interface to create a label and thereupon label a portion of the document;
   the providing of an interface comprising providing an extraction tasks view, a text editor and an extraction plan view;
   computer readable program code configured to receive at least one labeled example, wherein the at least one labeled example is labeled by a user and wherein the at least one labeled example identifies a portion of the document to extract;
   computer readable program code configured to receive at least one clue label created by the user, wherein the clue label indicates a reason for extraction of the at least one labeled example;
   computer readable program code configured to store the received at least one labeled example and at least one clue label in the extraction plan;

computer readable program code configured to develop an extractor using the at least one labeled example and the at least one clue label;
the developing comprising conveying a predetermined structure for guiding a user and further comprising creating extraction rules based upon the at least one labeled example and the at least one clue label;
wherein the predetermined structure comprises the categories of: basic features, candidate generation, and consolidation;
computer readable program code configured to provide a test interface for the extractor;
computer readable program code configured to thereupon test the extractor through the test interface;
computer readable program code configured to display results of a test of the extractor conducted through the test interface;
computer readable program code configured to permit iteration of the steps of developing the extractor and testing the extractor; and
computer readable program code configured to export the extractor.

16. A computer program product comprising:
a computer readable storage medium having computer readable program code embodied therewith, the computer readable program code comprising:
computer readable program code configured to open one or more documents for extraction;
computer readable program code configured to provide an interface to create a label and thereupon label a portion of the document;
the providing of an interface comprising providing an extraction tasks view, a text editor and an extraction plan view;
computer readable program code configured to receive at least one labeled example, wherein the at least one labeled example is labeled by a user and wherein the at least one labeled example identifies a portion of the document to extract;
computer readable program code configured to receive at least one clue label created by the user, wherein the clue label indicates a reason for extraction of the at least one labeled example;
computer readable program code configured to store the received at least one labeled example and at least one clue label in the extraction plan;
computer readable program code configured to develop an extractor using the at least one labeled example and the at least one clue label;
the developing comprising conveying a predetermined structure for guiding a user and further comprising creating extraction rules based upon the at least one labeled example and the at least one clue label;
wherein the predetermined structure comprises the categories of: basic features, candidate generation, and consolidation;
computer readable program code configured to provide a test interface for the extractor;
computer readable program code configured to thereupon test the extractor through the test interface;
computer readable program code configured to display results of a test of the extractor conducted through the test interface;
computer readable program code configured to permit iteration of the steps of developing the extractor and testing the extractor; and
computer readable program code configured to export the extractor.

17. The computer program product according to claim 16, wherein said providing of an interface comprises providing an interface portion to permit said storing of the created label.

18. The method according to claim 1, wherein:
the extraction tasks view displays a sequence of tasks for the user to perform when developing the extractor, the sequence of tasks including: open document collection, label examples and clues of interest, develop extractor, test extractor, profile, and export;
said opening comprises:
permitting selection of one or more documents within a collection for review; and
displaying the selected one or more documents in the text editor;
said providing of an interface comprises:
permitting use of a text editor to highlight selected text;
permitting labeling of the selected text;
recording the labeled text in the extraction plan view; and
permitting labeling of additional clues relative to the selected text;
said developing comprises:
inserting a template statement into a file in the text editor; and
permitting the user to fill blanks in the template; and
said testing comprises:
visualizing results in an annotation explorer portion of the text editor; and
running the extractor on an input collection of documents.

* * * * *